United States Patent
Wood

(10) Patent No.: US 7,448,212 B2
(45) Date of Patent: Nov. 11, 2008

(54) ENGINE BLEED AIR PASSAGE AND METHOD

(75) Inventor: Terry G. Wood, Countryside, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 177 days.

(21) Appl. No.: 11/363,134

(22) Filed: Feb. 27, 2006

(65) Prior Publication Data

US 2007/0199318 A1  Aug. 30, 2007

(51) Int. Cl.
F02B 33/44 (2006.01)

(52) U.S. Cl. ......................... 60/605.2; 60/605.1; 60/598

(58) Field of Classification Search .................. 415/163, 415/165; 74/606 A; 60/602
See application file for complete search history.

(56) References Cited

U.S. PATENT DOCUMENTS 6,435,169 B1   8/2002 Vogt
6,564,554 B2 *  5/2003 Hercey et al. .................. 60/602
6,609,375 B2 *  8/2003 Allen et al. .................... 60/608
6,925,806 B1   8/2005 Zollinger et al.
7,043,916 B2 *  5/2006 Masuda ........................ 60/608

* cited by examiner

Primary Examiner—Thomas Denion
Assistant Examiner—Douglas J. Duff
(74) Attorney, Agent, or Firm—Jeffrey P. Calfa; Gerald W. Askew

(57) ABSTRACT

An internal combustion engine (100) includes a turbocharger having a turbine (108) and a compressor (118) with an air inlet (120) and a charge air outlet (119). An electronic actuator (200) has an internal cavity (226). An intake manifold (104) is in fluid communication with the charge air outlet (119) of the compressor (118) through a cooled charge air passage (126). A bleed air passage (136) fluidly connects the cooled charge air passage (126), at a bleed air point (134), with the internal cavity (226) of the electronic actuator (200).

13 Claims, 3 Drawing Sheets

ENGINE BLEED AIR PASSAGE AND METHOD

FIELD OF THE INVENTION

This invention relates to internal combustion engines, including but not limited to electronic actuators connected to the internal combustion engines.

BACKGROUND OF THE INVENTION

Many modern engines use electronic engine controllers connected to electronic sensors and actuators to monitor and control operation of an engine. Some actuators are attached to turbochargers, which may have variable geometry nozzles controlled by the actuators. An electronic actuator often has electronic circuits attached thereon or integrated therein to monitor and control the operation of the electronic actuator based on commands received from the electronic engine controller.

Often, turbochargers are connected to the engine at a location that allows for practical connections to exhaust and air circuits. Many times, such locations experience high ambient temperatures during operation of the engine. High ambient temperatures may cause damage to the electronic components and connectors on the turbocharger, or other electronic components on the engine, if temperature limitations of those components are exceeded. Most electronic components attached to engines have temperature limitations of about 130 degrees C. Problems with excessive temperatures reached by engine electronic components may be exacerbated under conditions of heat soak of the engine, i.e., when a hot vehicle engine is shut down and convective heating of the engine compartment elevates under-hood component temperatures.

Various methods have been employed in the past for active cooling of electronic engine components. Examples of such cooling systems include heat exchangers that use engine fuel to remove heat from electronic engine controller modules, large fins used to remove heat from electronic controllers through convection, engine coolant heat exchangers to remove heat from components, ram air cooling of components, and so forth. Such methods are often complicated and expensive.

Accordingly, there is a need for simple and cost effective heat management of under-hood electronic engine components, especially electronic components that are exposed to high operating temperatures, such as components attached to turbochargers.

SUMMARY OF THE INVENTION

Cooling an electronic component of an engine using cooled bleed air from a compressor is advantageous because it offers a low cost and low complexity solution to the issue of component overheating. A cooling configuration such as the one described herein requires no additional sources of coolant fluid because the coolant fluid used is cooled air, a fluid that is readily available on an engine having a compressor.

An internal combustion engine includes a turbocharger that includes a turbine and a compressor having an air inlet and a charge air outlet. An electronic actuator has an internal cavity. An intake manifold is in fluid communication with the charge air outlet of the compressor through a cooled charge air passage. A bleed air passage fluidly connects the cooled charge air passage, at a bleed air point, with the internal cavity of the electronic actuator.

An electronic actuator includes a housing that forms a cooling air passage and a drive chamber. A motor and a plurality of gears are located in the drive chamber, are connected to the housing, and are located in the drive chamber. The plurality of gears operably connects the motor with an output shaft. An electronics pack is included in the electronic actuator and is connected to the housing. An air inlet port and an air outlet port are fluidly connected to each other through the cooled air passage. At times, a flow of air passes through the cooled air passage and convectively removes heat from the electronic actuator.

A method of cooling an electronic component that is connected to an internal combustion engine includes the step of compressing an air flow in a compressor to yield a compressed air flow. The compressed air flow is cooled in a cooler to yield a cooled air flow. A portion of the cooled air flow is bled from a location upstream of an intake manifold at a bleed point. The portion of the cooled air flow is routed through a bleed passage to an internal cavity of the electronic component, and then exhausted from the internal cavity carrying with it heat convectively removed from the electronic component.

DESCRIPTION OF A PREFERRED EMBODIMENT

Figure 1:
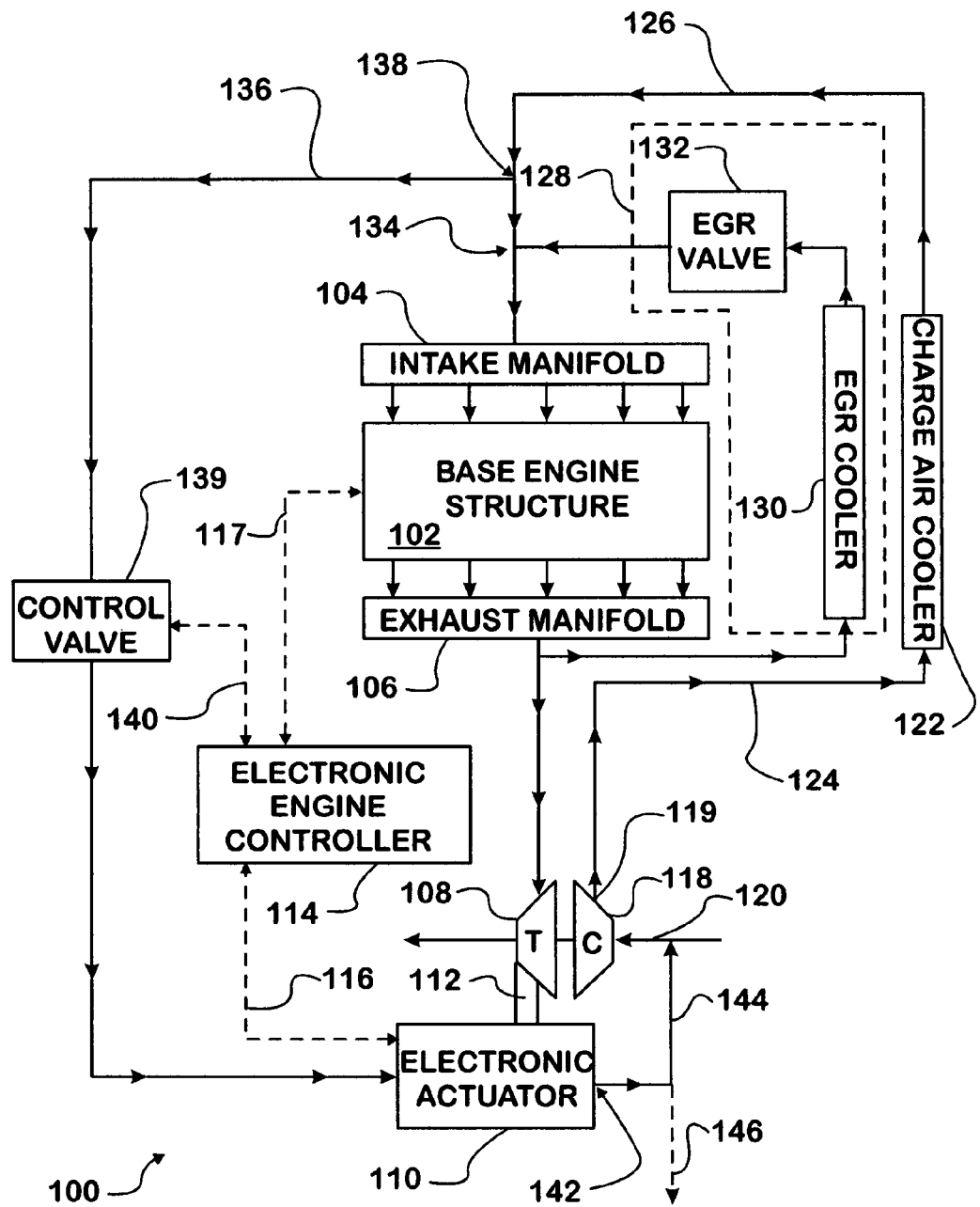
FIG. 1 is a block diagram of an internal combustion engine having a bleed air passage in accordance with the invention.

The following describes an apparatus for and method of cooling an electronic actuator for a turbocharger that is connected to an internal combustion engine. One example of such an electronic actuator may be found in U.S. Pat. No. 6,435,169 by Vogt, issued on Aug. 20, 2002, which is incorporated herein in its entirety by reference. A block diagram showing flow paths for intake air and exhaust gas during operation of an engine 100 is shown in FIG. 1. The engine 100 includes a base engine structure 102 that is connected to an intake manifold 104 and an exhaust manifold 106. The exhaust manifold 106 is fluidly connected to a turbine 108. During operation of the engine 100, exhaust gas is collected in the exhaust manifold 106 and supplied to operate the turbine 108. Exhaust gas passing through the turbine 108 is released to the environment, or alternatively supplied to another turbine (not shown).

The turbine 108 may be a variable geometry turbine and may have, for example, a plurality of internal vanes used to direct exhaust gas internally to the turbine to improve the performance of the turbine under varying conditions. One example of a variable geometry turbine can be found in U.S. Pat. No. 6,925,806 by Zollinger et al., published on Aug. 9, 2005, the contents of which are incorporated herein in their entirety by reference. An electronic actuator 110 is connected to the turbine 108, and a linkage arm 112 disposed therebetween is arranged to transfer motion from the electronic actuator 110 to a vane positioning mechanism (not shown) in the turbine 108. The electronic actuator 110 may be directly connected to the turbine 108, or alternatively may be connected to a bracket attached either on the turbine 108 or to another component adjacent thereto.

During operation of the engine 100, the electronic actuator 110 may exchange information with an electronic engine controller (EEC) 114 through a communications linkage 116. The EEC 114 is typically arranged to operate a multi-level control algorithm that monitors and controls various systems on the engine 100. Information exchanged between the EEC 114 and the electronic actuator 110 may include command signals, temperature information, and/or operational status for the actuator 110, and others. The EEC 114 is also connected to various sensors and actuators (not shown) in the base engine structure 102 through a wire harness 117.

The turbine 108 is also connected to a compressor 118 having a charge air outlet 119. The compressor 118 is arranged to ingest air through an inlet passage 120 and supply compressed air during operation of the engine 100 to the intake manifold 104. Compressed air from the charge air outlet 119 of the compressor 118 may pass through a charge air cooler 122 before reaching the intake manifold 104. Compressed air supplied to the charge air cooler 122 from the compressor 118 passes through a hot charge air passage 124 that connects the charge air cooler 122 with the compressor 118. A cooled air passage 126 connects the charge air cooler 122 with the intake manifold 104.

The engine 100 may also have an exhaust gas recirculation (EGR) system 128 that includes an EGR cooler 130 and an EGR valve 132, which may be connected in series to each other. The EGR system 128 may fluidly connect the exhaust manifold 106 with the intake manifold 104. A mixing junction 134 in the cooled charge air passage 126 receives cooled compressed air from the charge air cooler 122, and mixes the cooled compressed air with exhaust gas from the EGR system 130 to yield a mixture that is supplied to the intake manifold 104.

A bleed air passage 136 is advantageously connected to the cooled charge air passage 126 at a bleed air location 138. The bleed air location 138 may be part of the cooled charge air passage 126 and located at an upstream location with respect to the mixing junction 134 to ensure that any air bled from the cooled charge air passage 126 contains little or no exhaust gas from the EGR system 128. The bleed air passage 136 may also be connected to the electronic actuator 110 of the turbine 108. The electronic actuator 110 may be subjected to high internal and external temperatures during operation of the engine 100 due to external conductive and convective heat input from sources including the turbine housing 108, exhaust manifold, and/or the electronic components operating within a housing of the actuator 110. Air reaching the electronic actuator 110 through the bleed air passage 136 may be used to cool a portion thereof, or the entire electronic actuator 110, through convective heat transfer.

A control valve 139 may be connected to the bleed air passage 136 and arranged to fluidly cut off the flow of bleed air passing through the passage 136 at selected times during operation of the engine 100. The control valve 139 may advantageously be a pulse-width-modulated (PWM) solenoid valve that is connected to the EEC 114 through an electrical pathway 140. When the engine 100 requires an entire quantity of air in the passage 126 to operate efficiently, for example, during transient operation, the control valve 139 may be closed so as not to bleed away and deprive the engine 100 of any quantity of air from the cooled air passage 126.

Air passing through the cooled air passage 126 may advantageously be cooler than an operating temperature of the electronic actuator 110 during operation of the engine 100. The charge air cooler 122 may be adequately sized to output air at a maximum temperature of about 40 deg. F. (4 deg. C.) above an ambient air temperature. Under conditions of high ambient temperatures, for example ambient temperatures of 120 deg. F. (49 deg. C.), a temperature of air exiting the charge air cooler 122 might be about 120+40=160 deg. F. (71 deg. C.) which is lower than a maximum allowable operating temperature for the electronic actuator 110, which may be about 270 deg. F. (130 deg. C.).

An amount of bleed air entering the electronic actuator 110 from the bleed air passage 136 may pass through the electronic actuator 110 and exit through an air outlet 142 of the electronic actuator 110. The air outlet 142 of the electronic actuator 110 may be fluidly connected to the inlet passage 120 of the compressor 118 through a closed return passage 144, or may alternatively be exhausted to the atmosphere through an open return passage 146, shown in a dashed line in FIG. 1. Moreover, the control valve 139 may be integrated with the electronic actuator 110.

Figure 2:
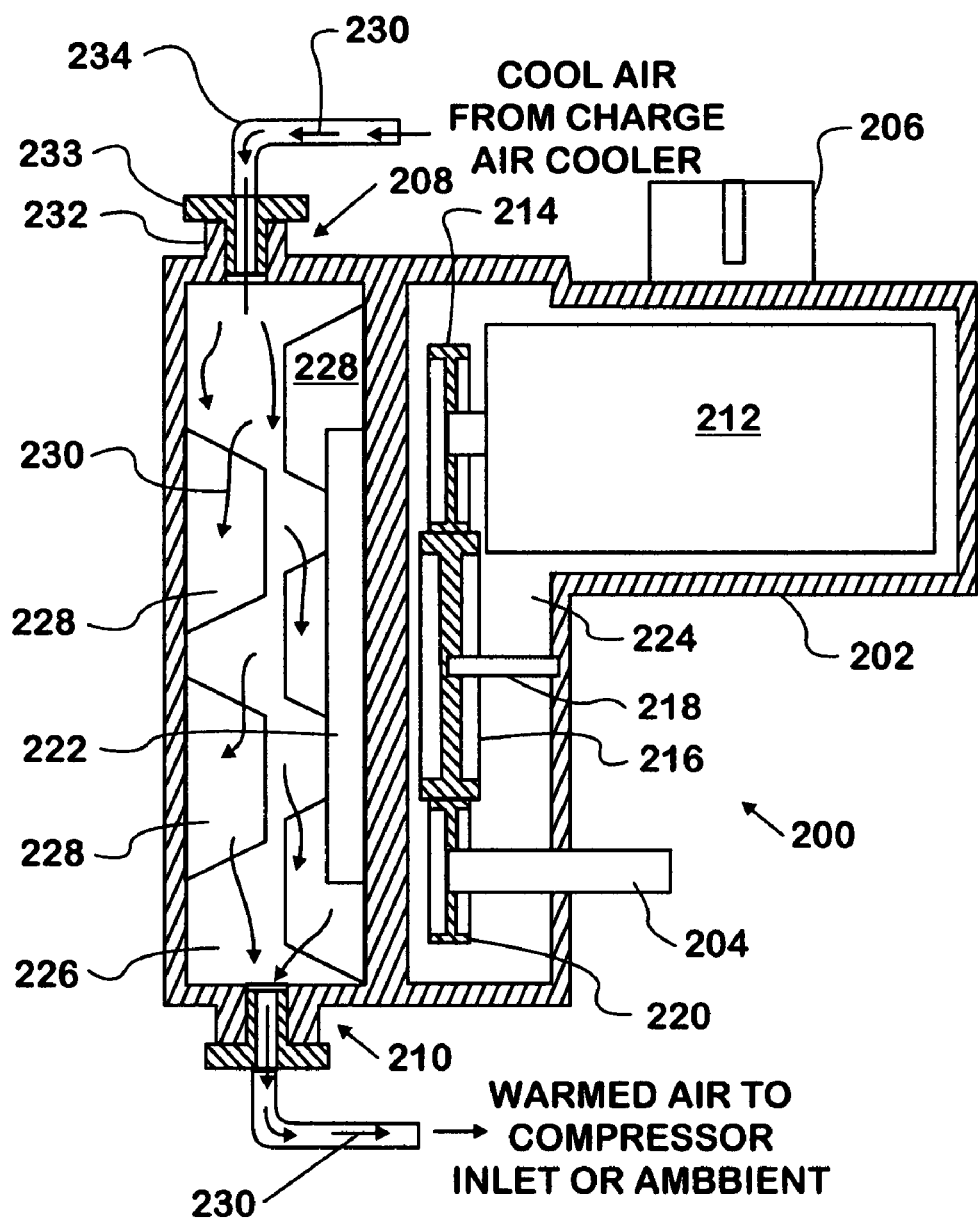
FIG. 2 is a cross section view of an electronic actuator in accordance with the invention.

One embodiment of an electronic actuator 200 is shown in FIG. 2. The electronic actuator 200 may be similar to known electronic actuators, but with the addition of a cooling air passage integrated therewithin. The electronic actuator 200 may include a housing 202, an output shaft 204, a connector 206, a bleed air input 208, and a bleed air output 210. The housing 202 may enclose internal components of the electronic actuator 200, which may include an electric motor 212, a drive gear 214, an idler gear 216 connected to the housing through an idler pin 218, an output gear 220 connected to the output shaft 204, and an electronics pack 222. Additional components of the electronic actuator 200, which are not shown for the sake of clarity and brevity, may include electrical leads connecting the connector 206 with the motor 212 and the electronics pack 222, bearings connected between the idler pin 218 and/or the output shaft 204 and the housing, and/or various fasteners or covers used to close, seal, and/or assemble the electronics actuator 200.

During operation of the electronic actuator 200, a rotational motion of the motor 212 may be transferred to the output shaft 204 through the gears 214, 216, and 220. Any heat generated by the motor 212 may be conductively transferred to the housing 202. Similarly, the electronics pack 222 that may include temperature sensors (not shown) and/or micro-controller circuits (not shown), may generate heat which may also be transferred, in part, to the housing 202.

The housing 202 may include a drive chamber 224 which may be sealed from the environment, and a cooling air passage 226 integrated therewithin. The cooling air passage 226 may be open to the bleed air inlet input 208 and the bleed air output 210. A plurality of fins 228 may be integrated with the housing 202. The fins 228 may lie within the passage 226 to enhance a transfer of heat through conduction from the housing 202 to a flow of bleed air 230. The flow of bleed air 230 that may be passing through the passage 226 is denoted by open head arrows.

In one embodiment, the bleed air input 208 may have a threaded boss 232 with a fitting 233 attached thereon that is connected to an air inlet pipe 234. Similarly, the bleed air output 210 may have a boss 236 connected to an air outlet pipe 238 that disposes of the flow of bleed air 230 into the environment or into an inlet of a compressor, as discussed above. Moreover, the drive chamber 224 may be in fluid communication with the bleed air input 208 and the bleed air output 210, and the flow 230 may additionally pass through the drive chamber 224 to cool additional components, including the motor 212.

Figure 3:
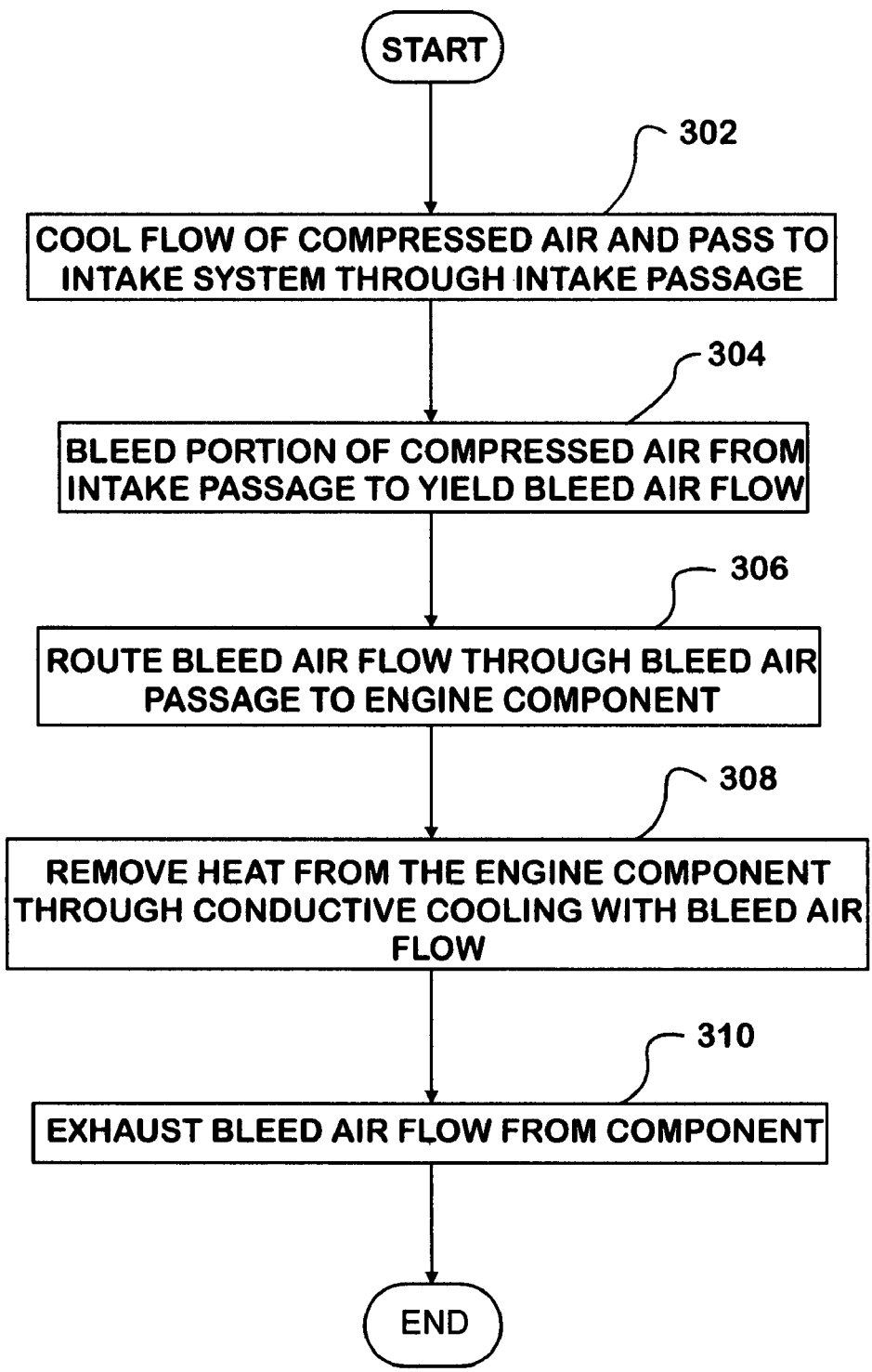
FIG. 3 is a flowchart for a method of cooling an electronic engine component attached to an engine in accordance with the invention.

A flowchart for a method of cooling an electronic engine component attached to an engine is shown in FIG. 3. When the engine operates, a flow of compressed air is cooled and passed to an intake system of the engine through an intake passage at step 302. A portion of the compressed air is bled from the intake passage to yield a bleed air flow at step 304. The bleed air flow, carried by a bleed air path, is routed to the electronic engine component at step 306. When inside the engine component, the bleed air flow may remove heat from the electronic engine component through convection at step 308. Having passed through the engine component, the bleed air flow may be exhausted at step 310. This method may be repeated as long as the engine is in operation, or alternatively as long as cooling of the engine component is desired while the engine is operating.

Additional steps for the method of cooling an electronic engine component may include controlling a flow of the portion of air with a control valve that is located in the bleed air path. The control valve may be controlled by an engine electronic engine controller, which may be arranged to receive signals from various sensors on the engine, interpret these signals, and issue commands to various actuators, including the control valve, based on an engine control algorithm that may be operating therein. The electronic engine controller may advantageously command the control valve to close when the engine is operating in a transient condition.

Another additional step for the aforementioned method may include an optional exhaust path for the bleed air into an inlet passage for a compressor that is connected to the engine. Alternatively, the bleed air may be exhausted to the environment.

Cooling an electronic component of an engine using cooled bleed air from a compressor is advantageous because it offers a low cost and low complexity solution to the issue of component overheating. A cooling configuration such as the one described herein requires no additional sources of coolant fluid, because the coolant fluid used is air, which is readily available on an engine having a compressor. The addition of a control valve in the bleed air passage is advantageous because it enables selective cooling of a component based on engine operating conditions. Use of bleed air to cool engine components finds special advantages when used to cool an electronic actuator attached to a turbine.

A cooling effect that may be achieved with the embodiments described herein will depend on various design factors which may be elected according to each engine's specific configuration and size. For example, air may be bled from the intake system of an engine at a location other than those described herein if there is an adequate pressure to induce a flow of bleed air through the component sought to be cooled.

Cooling of an engine component by use of circulating bleed air from an intake system may advantageously lower a steady state operating temperature of the engine component by a considerable level. If the operating temperature of the engine component is lowered enough, then the temperature of the engine component that exists after the engine is shut down and during a heat soak period may advantageously not increase past a maximum tolerable temperature of the engine component.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An internal combustion engine, comprising:
a turbocharger that includes a turbine, and a compressor having an air inlet and a charge air outlet;
an electronic actuator having an internal cavity;
an intake manifold in fluid communication with the charge air outlet of the compressor through a cooled charge air passage;
a bleed air passage fluidly connecting the cooled charge air passage at a bleed air point with the internal cavity of the electronic actuator,
wherein a bleed air path is defined beginning at the bleed air point, passing through the bleed air passage, and passing through the internal cavity of the electronic actuator, further comprising an exhaust gas recirculation system disposed in fluid communication with an exhaust manifold and with the cooled charge air passage at a junction, wherein the junction is downstream of the bleed air point when the engine is in operation.

2. The internal combustion engine of claim 1, further comprising a control valve in fluid communication with the bleed air passage, the control valve disposed between the cooled charge air passage and the internal cavity of the electronic actuator in the bleed air path.

3. The internal combustion engine of claim 1, wherein the electronic actuator is arranged to vary geometry of the variable geometry turbine and wherein the electronic actuator is operably connected to the turbine.

4. The internal combustion engine of claim 1, wherein the bleed air path further passes through a bleed air exhaust disposed on the electronic actuator and wherein the bleed air exhaust is in fluid communication with the air inlet of the compressor.

5. The internal combustion engine of claim 1, wherein the bleed air path further passes through a bleed air exhaust disposed on the electronic actuator, and wherein the bleed air exhaust is open to the atmosphere.

6. The internal combustion engine of claim 1, further comprising an electronic engine controller, wherein the electronic engine controller is operably electrically connected to the electronic actuator and to the control valve.

7. The internal combustion engine of claim 1, further comprising a charge air cooler in fluid communication with the intake manifold and disposed between the bleed air point and the charge air outlet of the compressor.

8. The internal combustion engine of claim 1, wherein the electronic actuator includes a housing defining the internal cavity, the housing having a plurality of fins disposed in the internal cavity.

9. The internal combustion engine of claim 1, wherein the electronic actuator includes an electronics pack that includes a microcontroller.

10. A method of cooling an electronic component that is connected to an internal combustion engine, comprising the steps of:
compressing an air flow in a compressor to yield a compressed air flow;
cooling the compressed air flow in a cooler to yield a cooled air flow;
bleeding a portion of the cooled air flow upstream of an intake manifold at a bleed point;
routing the portion of the cooled air flow through a bleed passage to an internal cavity of the electronic component;
removing heat from the electronic component through conductive cooling with the portion of the cooled air flow;
exhausting the portion of the cooled air flow from the internal cavity;
further comprising the step of recirculating a quantity of exhaust gas taken from an exhaust manifold into an intake manifold at a junction;

wherein the junction is downstream of the bleed air point when the internal combustion engine is in operation.

11. The method of claim 10, further comprising the step of closing the bleed passage to substantially stop a flow of the portion of bleed air from reaching the internal cavity with a control valve.

12. The method of claim 11, further comprising the step of deciding on an open state and a closed state of the control valve in an electronic engine controller.

13. An internal combustion engine comprising:
   a turbocharger having a turbine that operates a compressor to develop charge air for the engine and an actuator for operating an adjustable mechanism of the turbine, wherein the actuator comprises,
   a housing that is partitioned into a motor compartment comprising an interior containing a motor that is coupled to the adjustable mechanism and a controller compartment containing an electronic controller for the motor,
   an air bleed passage for bleeding charge air developed by the compressor to the interior of the controller compartment,
   and an air outlet passage from the interior of the controller compartment, wherein the electronic controller is disposed in an airflow path for charge air flowing through the interior of the controller compartment,
   further comprising a charge air cooler downstream of the compressor, wherein the air bleed passage is arranged to bleed charge air that has passed through the charge air cooler to the interior of the controller compartment, and further including an exhaust gas recirculation system for recirculating exhaust gas from the engine to mix with charge air entering the engine at a junction that is downstream of where the air bleed passage bleeds charge air to the interior of the controller compartment.

\* \* \* \* \*